United States Patent
Amamoto et al.

(10) Patent No.: US 7,323,153 B2
(45) Date of Patent: Jan. 29, 2008

(54) REPROCESSING METHOD BY FLUORIDE VOLATILITY PROCESS USING FRACTIONAL DISTILLATION

(75) Inventors: Ippei Amamoto, Higashi-Ibaraki-gun (JP); Koji Sato, Higashi-Ibaraki-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 0 days.

(21) Appl. No.: 11/097,244

(22) Filed: Apr. 4, 2005

(65) Prior Publication Data

US 2006/0057042 A1 Mar. 16, 2006

(30) Foreign Application Priority Data

Jul. 30, 2004 (JP) ............................. 2004-224444

(51) Int. Cl.
- G21C 19/44 (2006.01)
- C01G 43/06 (2006.01)
- C01G 56/00 (2006.01)

(52) U.S. Cl. ...................... 423/251; 423/253; 423/258; 423/249; 423/259; 423/3; 423/19

(58) Field of Classification Search ............ 423/3, 423/19, 489, 249, 251, 253, 258, 259
See application file for complete search history.

(56) References Cited

U.S. PATENT DOCUMENTS

| | | | | |
|---|---|---|---|---|
| 3,644,104 A | * | 2/1972 | Manevy et al. ................. | 423/3 |
| 3,708,568 A | * | 1/1973 | Golliher et al. ................. | 423/6 |
| 3,963,564 A | * | 6/1976 | Lecocq ........................ | 376/310 |
| 4,710,222 A | * | 12/1987 | FitzPatrick et al. ........... | 75/393 |
| 5,076,839 A | * | 12/1991 | Boyd et al. ................... | 75/631 |
| 5,118,343 A | * | 6/1992 | Coops ......................... | 75/396 |
| 6,442,226 B1 | * | 8/2002 | Venneri et al. .............. | 376/170 |

FOREIGN PATENT DOCUMENTS

| | | |
|---|---|---|
| JP | 2001-153991 | 6/2001 |
| RU | 2108295 C1 * | 4/1998 |

* cited by examiner

*Primary Examiner*—Ngoc-Yen Nguyen
(74) *Attorney, Agent, or Firm*—Wenderoth, Lind & Ponack, L.L.P.

(57) ABSTRACT

Fluorine or a fluorine compound is subjected to a reaction with a spent oxide fuel to produce fluorides of uranium and plutonium, and recovering the fluorides using a difference in volatility behavior. The method includes steps of: subjecting a mixture of $UO_2$ and $PuO_2$ with hydrogen fluoride mixed with hydrogen to HF-fluorinate uranium and plutonium into $UF_4$ and $PuF_3$; subjecting $UF_4$ and $PuF_3$ with a fluorine gas to $F_2$-fluorinate uranium and plutonium into $UF_6$ and $PuF_6$; and fractionating $UF_6$ and $PuF_6$ using a difference in phase change of obtained $UF_6$ and $PuF_6$, removing a part of $UF_6$, and volatilizing the remaining $UF_6$ and $PuF_6$ at the same time. By such a reprocessing method, $PuF_4$ hard to undergo a reaction is prevented from being formed as an intermediate fluoride, the material of a reactor is hard to be corroded, and a consumption of expensive fluorine gas is reduced.

4 Claims, 3 Drawing Sheets

REPROCESSING METHOD BY FLUORIDE VOLATILITY PROCESS USING FRACTIONAL DISTILLATION

BACKGROUND OF THE INVENTION

1. Field of the Invention

The present invention relates to a method of separating and purifying nuclear fuel substances using a difference in fluorination volatility behavior of uranium, plutonium and other elements in a spent oxide fuel to reprocess the spent oxide fuel.

2. Description of the Related Art

A fluoride volatility process is one of methods for dry reprocessing of a spent fuel, in which nuclear fuel substances such as uranium and plutonium and various kinds of nuclear fission products are separated and recovered using a difference in volatility behavior when they are fluorinated. Techniques for applying the fluoride volatility process to a reprocessing process have been developed in the U.S. and other various countries since 1950s. However, each of those techniques has problem in higher fluorination and purification of plutonium. None of these techniques has reached a practical phase, and there has been no progress since 1970s.

In Japan, Japan Atomic Energy Research Institute has carried out the fluoride volatility process, and many advantages have been found, but development of the technique has been ended without establishing a plutonium purification step. In the fluoride volatility process carried out in that institute, uranium and plutonium are separated by two-stage fluorination using a fluidized bed furnace as a reactor with the temperature and fluorine concentration being changed. For example, in the first stage, uranium is fluorinated with an $F_2$ concentration of 20% at the operating temperature of 330° C., and in the second stage, plutonium is fluorinated with an $F_2$ concentration of 100% at the operating temperature of 330 to 550° C.

However, there is a disadvantage that it takes much time to convert uranium into uranium hexafluoride ($UF_6$) because the reaction temperature in "fluorination of uranium" of the first stage is low, and that plutonium easily forms the most stable plutonium tetrafluoride ($PuF_4$). Further, in "fluorination of plutonium" of the second stage, there is a disadvantage that plutonium is hard to be converted into plutonium hexafluoride ($PuF_6$) (the conversion ratio or conversion rate decreases) from the point of view of thermodynamics and reaction temperature because plutonium forms into $PuF_4$ of an intermediate fluoride in the first stage, and the fluorine concentration is so high that incomplete fluidization easily occurs.

Thus, a reprocessing process according to a fluoride volatility process using a flame furnace as a reactor has been proposed (see, for example, Japanese Patent Laid-Open Specification No. 2001-153991). Unlike the fluidized bed furnace, the flame furnace is a reactor operating under conditions of high temperature and high fluorine gas atmosphere.

If plutonium is converted under the conditions, a direct fluorination reaction of $PuO_2 + 3F_2$ (or $6F) \rightarrow PuF_6 + O_2$ occurs, and therefore $PuF_4$ is never produced as an intermediate fluoride. In addition, because the fluorination temperature and fluorine concentration are high, decomposition reaction of $PuF_6$ is hard to proceed. However, since a corrosive gas at high temperatures and in high concentrations is required for the reaction, and conversion conditions are severe, the reactor is easily corroded and deteriorated, thus causing a problem in terms of materials. In addition, there are disadvantages that temperature adjustment for conversion conditions of a target substance is impossible, a large amount of expensive fluorine gas is used, and so on.

SUMMARY OF THE INVENTION

Problems to be solved by the present invention are to establish a method for producing $PuF_6$ in which $PuF_4$ hard to fluorinate further is prevented from being formed as an intermediate fluoride, to establish a method for producing $PuF_6$ in which the material of a reactor is harder to corrode, to reduce a consumption of expensive fluorine gas, and so on.

According to the present invention, there is provided a reprocessing method by a fluoride volatility process using fractional distillation in which fluorine or a fluorine compound is subjected to a reaction with a spent oxide fuel in two stages to produce fluorides of uranium and plutonium, and recover uranium and plutonium as the fluorides using a difference in volatility behavior, the reprocessing method comprising the steps of:

HF fluorination of the spent oxide fuel containing $UO_2$ and $PuO_2$ in the reaction thereof with hydrogen fluoride mixed with hydrogen to produce $UF_4$ and $PuF_3$ as a first stage;

$F_2$ fluorination of $UF_4$ and $PuF_3$ in the reaction thereof with fluorine gas to produce $UF_6$ and $PuF_6$ as a second stage; and separation and volatilization of the resulting $UF_6$ and $PuF_6$ by fractionally distillating them (separating a gas and a liquid) due to a difference in phase change therebetween to remove a part of $UF_6$ as gas, and then volatilizing the remaining $UF_6$ and $PuF_6$ at the same time.

In the reprocessing method, the first stage HF fluorination step is carried out preferably by supplying a hydrogen fluoride gas containing 10 to 30 vol % of hydrogen using a fluidized bed furnace operated in the temperature range of 350 to 430° C., and the second stage $F_2$ fluorination step is carried out preferably by supplying a fluorine gas diluted to 20 to 40 vol % using a fluidized bed furnace operated in the temperature range of 500 to 750° C.

The separation and volatilization step is carried out by using at least one cold trap, and the removal of the part of $UF_6$ is carried out by fractional distillation (gas-liquid separation) at the operating temperature and pressure controlled so that $UF_6$ is in a gas region and $PuF_6$ is in a liquid region in the phase diagrams of $UF_6$ and $PuF_6$.

In the reprocessing method by the fluoride volatility process using fractional distillation according to the present invention, the spent oxide fuel is subjected to a reaction with hydrogen fluoride mixed with hydrogen in the first stage, and the resultant fluorides are subjected to a reaction with a fluorine gas in the second stage, and thus $PuF_4$ hard to undergo a reaction into a higher fluoride is never produced as an intermediate fluoride, thus making it possible to improve the ratio and rate of conversion into $PuF_6$ and to reduce a consumption of expensive fluorine gas. In addition, since the fluidized bed furnaces are used to carry out reactions under lenient conditions in both first and second stages, the furnaces are hard to be corroded or deteriorated.

DETAILED DESCRIPTION OF THE PREFERRED EMBODIMENTS

Figure 1:
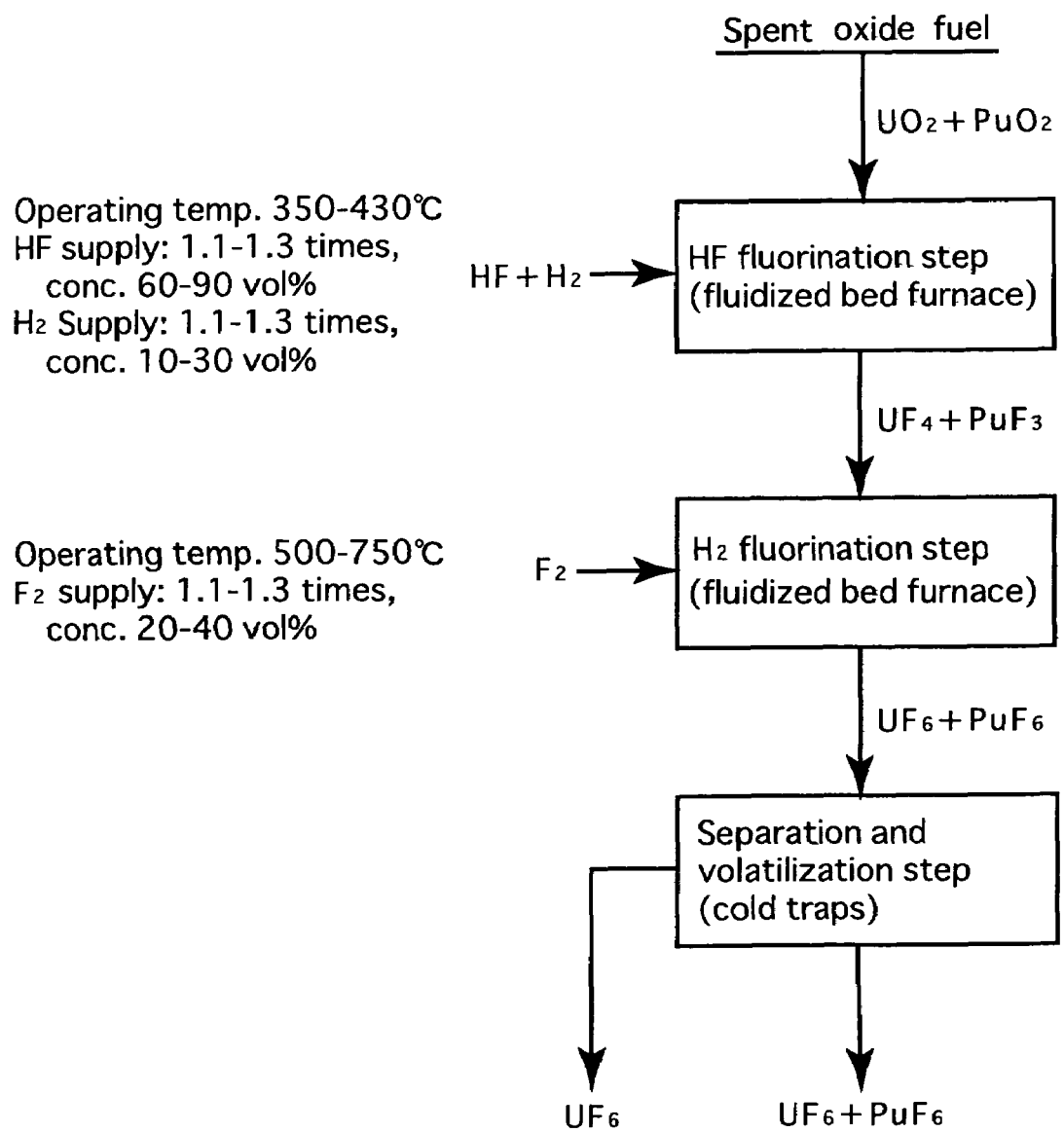
FIG. 1 is an explanatory diagram showing a basic process of a reprocessing method by a fluoride volatility process using fractional distillation according to the present invention.

FIG. 1 is an explanatory view showing a basic process of a reprocessing method by a fluoride volatility process using fractional distillation according to the present invention. This is a reprocessing method in which fluorine or a fluorine compound is subjected to a reaction with a spent oxide fuel in two stages to produce fluorides of uranium and plutonium, and uranium and plutonium are recovered as $UF_6$ and $UF_6+PuF_6$ using a difference in volatility behavior.

The first stage is an HF-fluorination step, where HF fluorination of a spent oxide fuel containing $UO_2$ and $PuO_2$ is conducted in the reaction thereof with hydrogen fluoride mixed with hydrogen to produce $UF_4$ and $PuF_3$. The HF-fluorination step is carried out by supplying a hydrogen fluoride gas (supply: 1.1 to 1.3 times the stoichiometric ratio, concentration: 60 to 90 vol %) containing 10 to 30 vol % of hydrogen using a fluidized bed furnace operated in the temperature range of 350 to 430° C. For the $H_2$ gas, dependency on the concentration is not significant as long as a sufficient amount is supplied, and its concentration may be 5 vol % or greater, but is preferably 10 to 30 vol % when the HF concentration is 70 vol %. For the supply of hydrogen fluoride gas, an optimum amount was found to be 1.15 times the stoichiometric ratio from thermodynamic calculation and empirically, and the supply of hydrogen fluoride gas which is 1.1 to 1.3 times the stoichiometric ratio brought about a preferred result. Both $UF_4$ and $PuF_3$ produced in this way tend to form into hexafluorides easily from a thermodynamic viewpoint. The used amount of expensive fluorine gas can be reduced by about 60% compared to conventional methods because an HF gas is used in the HF fluorination.

The second stage is an $F_2$ fluorination step, where $F_2$ fluorination of $UF_4$ and $PuF_3$ is conducted in the reaction thereof with a fluorine gas to produce $UF_6$ and $PuF_6$. The $F_2$ fluorination step is carried out by supplying a fluorine gas (supply: 1.1 to 1.3 times the stoichiometric ratio) diluted to 20 to 40 vol % using a fluidized bed furnace operated in the temperature range of 500 to 750° C. Conversion of $UF_4$ by the fluorine gas is not particularly cumbersome because it has been already performed on a commercial scale, and conversion of $PuF_3$ into $PuF_6$ can be carried out at a low temperature (500 to 750° C.) easily, speedily and stably compared to the conversion of $PuF_4$ into $PuF_6$. In the above two-stage fluorination process according to the present invention has an advantage that $PuF_6$ can be produced without the intermediation of $PuF_4$.

The resulting $UF_6$ and $PuF_6$ are fractionally distillated using a difference in phase change thereof to remove a part of $UF_6$ as gas, and then the remaining $UF_6$ and $PuF_6$ are volatilized at the same time (separation and volatilization step). Cold traps are used in this step, and a part of $UF_6$ is removed by fractional distillation at the operating temperature and pressure controlled so that $UF_6$ is in a gas region and $PuF_6$ is in a liquid region in the well-known phase diagrams of $UF_6$ and $PuF_6$. Conditions for the separation are set so that the pressure is about 83.6 kPa in the temperature range of 53 to 56.5° C. (about 85.01 kPa at 53.4 to 57° C.).

Consequently, $UF_6$ is vaporized and $PuF_6$ is liquefied, thus making it possible to separate them. The conditions are set in consideration of an operation on the negative pressure side, and therefore have a quite limited range, but if a separation operation is possible on the positive pressure side as well, an allowable range of pressure and temperature is wider. Then, the pressure is reduced to about 50 kPa, whereby the remaining $UF_6$ and $PuF_6$ are vaporized at the same time.

In this way, the fluoride volatility process can be applied to recover uranium and plutonium as $UF_6$ and $UF_6+PuF_6$. This reprocessing process can be used for a light water reactor nuclear fuel cycle, FBR nuclear fuel cycle or the like. If the processing object is a spent metal fuel, the method of the present invention can be applied by oxidizing the metal fuel as preprocessing.

EXAMPLES

Figure 2:
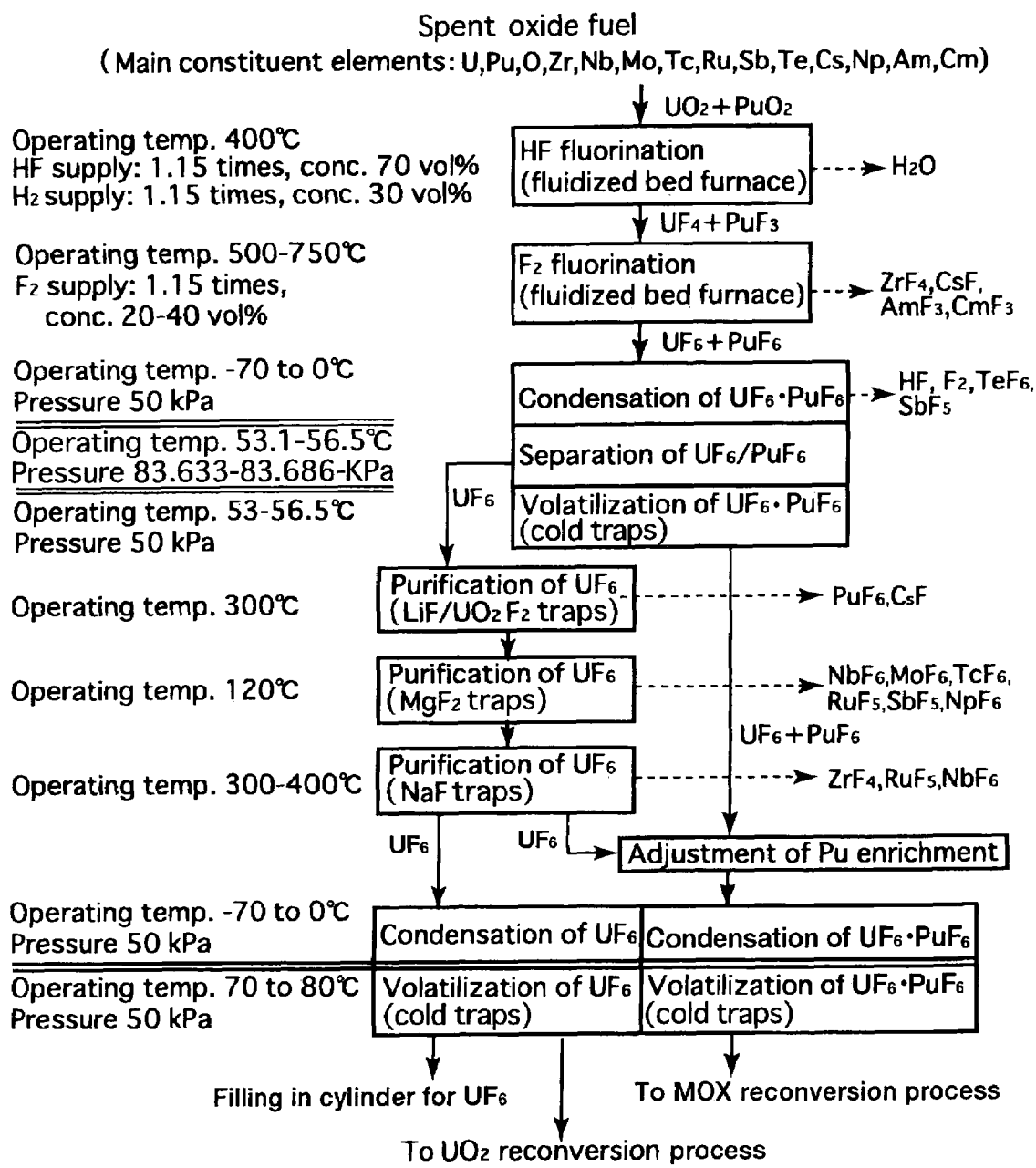
FIG. 2 is a process flow showing one example of the reprocessing method by the fluoride volatility process using fractional distillation according to the present invention.

FIG. 2 is a process flow showing one example of the reprocessing method by the fluoride volatility process using fractional distillation according to the present invention. This is an example of a process of reprocessing a spent oxide fuel. The spent oxide fuel as a raw material has been subjected to decladding processing, and its main constituent elements include U, Pu, O, Zr, Nb, Mo, Tc, Ru, Sb, Te, Cs, Np, Am and Cm, and uranium exists in a form of $UO_2$ and plutonium exits in a form of $PuO_2$. These raw materials are fluorinated in two stages.

<HF Fluorination>

In the first-stage HF fluorination, a raw material (spent oxide fuel) is subjected to a reaction with an HF gas (supply: 1.15 times the stoichiometric ratio, concentration: 70 vol %) using a fluidized bed furnace (operating temperature: 400° C.). At this time, an $H_2$ gas is also supplied, and the supply thereof is greater than 0.5 times the stoichiometric ratio to $PuO_2$, and the concentration may be any of 5 to 100 vol %, but should be 30 vol % if the $H_2$ gas is supplied along with 70 vol % HF. Consequently, $UF_4$ and $PuF_3$ are produced. Most impurities in the raw material remain oxides without undergoing a reaction, or form into fluorides or oxyfluorides. Resulting reactions are as shown below.

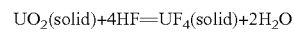

$UO_2(solid)+4HF=UF_4(solid)+2H_2O$

$PuO_2(solid)+3HF+1/2\ H_2=PuF_3(solid)+2H_2O$

<$F_2$ Fluorination>

In the second-stage $F_2$ fluorination, the intermediate fluorides produced in the first-stage HF fluorination are converted into the hexafluorides. The operating temperature of the fluidized bed furnace is set to 500 to 750° C., and the intermediate fluoride is subjected to a reaction with a fluorine gas to produce the hexafluorides of uranium and plutonium. The supplied fluorine gas is diluted with an $N_2$ gas to adjust the concentration of the fluorine gas to 20 to 40 vol % and the excess fluorine gas ratio to 1.15 times the stoichiometric ratio. By $F_2$ fluorination, uranium ($UF_6$) and plutonium ($PuF_6$) are volatilized along with many impurities, but $ZrF_4$, $CsF$, $PuF_4$, $AmF_3$, $CmF_3$ and the like remain along with a bed material because of the low vapor pressure. Some oxides that are not completely fluorinated ($UO_2$, etc.), oxyfluorides ($UO_2\ F_2$, etc.) and double salts ($Cs_2\ UF_8$, etc.) also remain.

<Condensation of $UF_6 \cdot PuF_6$>

Volatilized $UF_6$ and $PuF_6$ are condensed in cold traps. The operating temperature is −70 to 0° C., and the working pressure is about 50 kPa. Many volatile substances are condensed under the conditions, but most of $F_2$ (boiling point: −188.24° C.), HF (melting point: −84.79° C., boiling point: 19.67° C.) and $TeF_6$ (boiling point: −39.55° C.) each having a low melting or boiling point remains gaseous, and therefore solids and gases are separated from condensates.

<Separation of $UF_6/PuF_6$>

If the cold traps are decompressed to about 83.6 kPa at 53.1 to 56.5° C. (about 85.01 kPa at 53.4 to 57° C.), for example, $UF_6$ is vaporized and $PuF_6$ is liquefied (for this purpose, the temperature and pressure are set so that $UF_6$ is in a gas region and $PuF_6$ is in a liquid region in the phase diagrams of $UF_6$ and $PuF_6$). $UF_6$ and $PuF_6$ can be fractionally distillated under the conditions. Volatilized amount of $UF_6$ can be optionally set by appropriately controlling the temperature and pressure in actual operations. In light of the melting or boiling point of each substance, a part of $PuF_6$, and impurities having relatively low boiling points, such as $NbF_5$, $MoF_6$, $TcF_6$, $RuF_5$, $SbF_5$, $TeF_6$ and $NpF_6$, likely behave in conjunction with $UF_6$.

<Volatilization of $UF_6.PuF_6$>

A certain amount of $UF_6$ is volatilized, and then the pressure is reduced to about 50 kPa with the temperature of the cold traps unchanged, whereby $UF_6$ and $PuF_6$ can be vaporized at the same time. The temperature and pressure can be set in accordance with characteristics of the cold traps referring to the phase diagrams of $UF_6$ and $PuF_6$.

<Refinement of $UF_6$>

$UF_6$ produced by $F_2$ fluorination contains a very small amount of $PuF_6$ and volatile impurities. These impurities are made to pass through chemical traps filled with a substance having an action of chemically adsorbing the impurities, whereby the impurities can be removed to purify $UF_6$. Chemical traps are installed in multiple stages as required.

(1) LiF—$UO_2 F_2$ Traps

In this process, chemical traps using lithium fluoride (LiF) and uranyl fluoride ($UO_2F_2$) either alone or in combination as a filler are used in the first stage for the purpose of removal of $PuF_6$. Instead thereof, any filler having an action of reducing $PuF_6$ may be used, and use of $UF_4$ and $UF_5$ can be considered as well. The reaction between LiF and $PuF_6$ is a reversible reaction, $PuF_6$ is adsorbed to LiF at the operating temperature of 300° C., and detached from LiF by heating it to 450° C. Thus, LiF is used at the operating temperature of 300° C. CsF is adsorbed at the temperature, too. $PuF_6$ adsorbed to $UO_2F_2$ can be used in an MOX (mixed oxide) reconverting process as a raw material without being detached.

(2) $MgF_2$ Traps

Chemical traps using $MgF_2$ as a filler are provided in the second stage. $MgF_2$ has an action of adsorbing $NbF_6$, $MoF_6$, $TcF_6$, $RuF_5$, $SbF_5$ and $NpF_6$, and is used at the operating temperature of 120° C. here.

(3) NaF Traps

Chemical traps using NaF as a filler are installed in the third stage. NaF is known to adsorb $UF_6$ through the reaction of $UF_6+2NaF \rightarrow Na_2 UF_8$ at 25 to 250° C. $Na_2UF_8$ decomposes into NaF and $UF_6$ again at 300 to 400° C., but NaF forms double salts with $RuF_5$ and $NbF_6$. It has an action of adsorbing $ZrF_4$, but most of $ZrF_4$ remains in the fluidized bed furnace as a nonvolatile substance along with the bed material, and only a very small amount thereof is removed by the NaF traps.

<Adjustment of Pu Enrichment>

A mixed gas of volatilized $UF_6$ and $PuF_6$ and $UF_6$ purified by the chemical traps are mixed together in a desired ratio using a gas mixer, and the plutonium enrichment is adjusted. For operating conditions of the gas mixer, a slightly negative pressure and a temperature of about 70 to 80° C. are adopted.

<Condensation of $UF_6/UF_6.PuF_6$>

$UF_6$ not used for adjustment of the plutonium enrichment, of $UF_6$ purified by the chemical traps, or a mixed gas of $UF_6$ after adjustment of the plutonium enrichment and $PuF_6$ is condensed. The operating temperature is −70 to 0° C., and the pressure is about 50 kPa.

<Volatilization of $UF_6/UF_6.PuF_6$>

The temperature is increased to 70 to 80° C. with the pressure (50 kPa) unchanged, whereby the condensed $UF_6$ or mixture of $UF_6$ and $PuF_6$ is vaporized and provided for a reconversion process.

If vaporized simple $UF_6$ is filled in a cylinder for $UF_6$, it can be used as a raw material for uranium enrichment, and this process can be used in a light water reactor fuel cycle. As an option, by setting conditions for liquefying $UF_6$, in which the temperature of the cold traps trapping $UF_6$ is 64° C. or higher and the pressure is 152 kPa or greater, $UF_6$ can be liquefied and filled in the cylinder.

Figure 3:
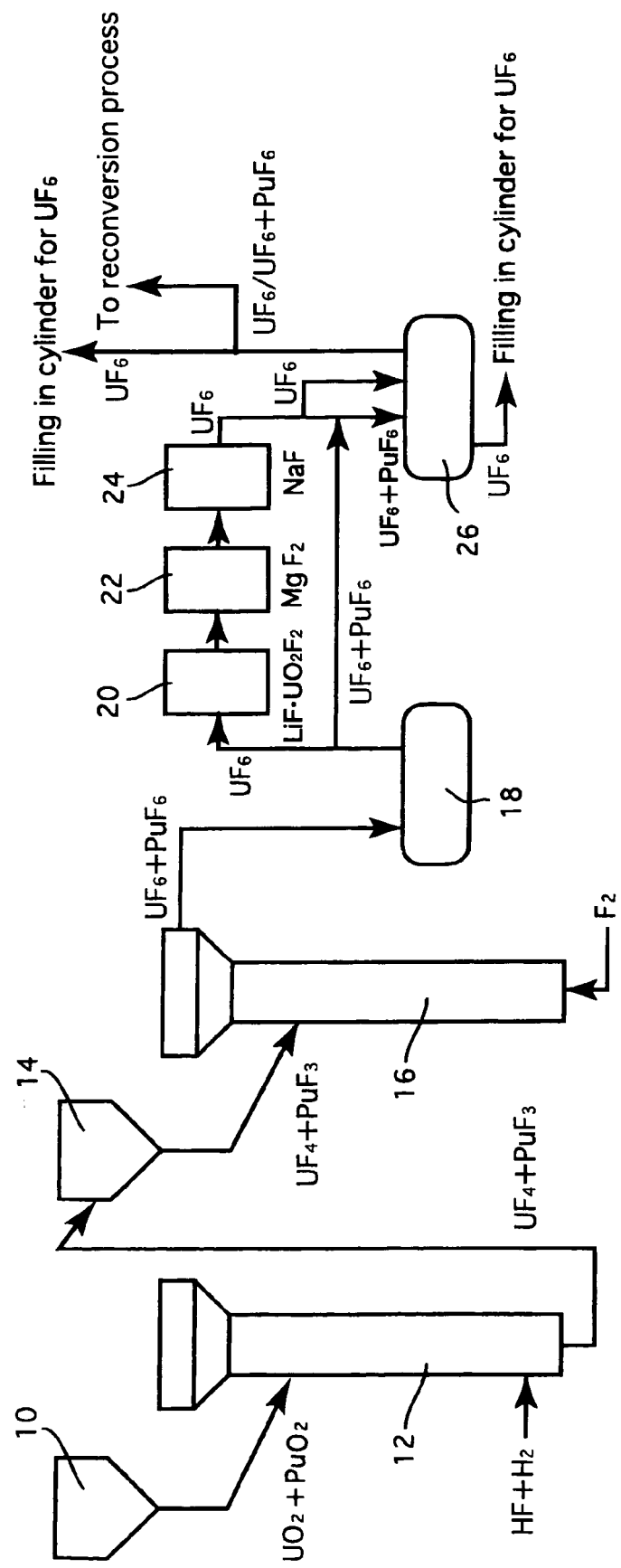
FIG. 3 is a block diagram of an apparatus for carrying out the reprocessing method by the fluoride volatility process using fractional distillation according to the present invention.

FIG. 3 is a block diagram of an apparatus for carrying out the above reprocessing method by a fluoride volatility process using fractional distillation. A raw material (spent oxide fuel) in a raw material supply tank 10 is fed to an HF fluorination furnace (fluidized bed furnace) 12, reacts with an HF+$H_2$ gas into an intermediate material, and is stored in an intermediate fluoride supply tank 14. The intermediate fluoride in the intermediate fluoride supply tank 14 is fed to an $F_2$ fluorination furnace (fluidized bed furnace) 16, and reacts with an $F_2$ gas into a hexafluoride.

The obtained hexafluoride is introduced into first cold traps 18, where $UF_6.PuF_6$ is condensed, $UF_6/PuF_6$ is separated, and UF6.PuF6 is volatilized. $UF_6$ is purified through LiF/$UO_2$ $F_2$ traps 20, $MgF_2$ traps 22 and NaF traps 24. $UF_6$ and $UF_6.PuF_6$ are introduced into second cold traps 26, where $UF_6$ is condensed and volatilized, and $UF_6.PuF_6$ is condensed and volatilized, and they are provided for the reconversion process.

What is claimed is:

1. A reprocessing method by a fluoride volatility process using fractional distillation in which fluorine or a fluorine compound is subjected to a reaction with a spent oxide fuel in two stages to produce fluorides of uranium and plutonium, and recover uranium and plutonium as the fluorides using a difference in volatility behavior, the reprocessing method comprising the steps of:

HF fluorination of the spent oxide fuel containing $UO_2$ and $PuO_2$ in the reaction thereof with hydrogen fluoride mixed with hydrogen to produce $UF_4$ and $PuF_3$ as a first stage, the HF fluorination step being carried out by supplying a hydrogen fluoride gas in a supply amount of 1.1 to 1.3 times the stoichiometric ratio and containing 10 to 30 vol % of hydrogen to a fluidized bed furnace operated in the temperature range of 350 to 430° C.;

$F_2$ fluorination of $UF_4$ and $PuF_3$ in the reaction thereof with fluorine gas to produce $UF_6$ and $PuF_6$ as a second stage; and separation and volatilization of the resulting $UF_6$ and $PuF_6$ by fractionally distillating them due to a difference in phase change therebetween to remove a part of $UF_6$ as gas, and then volatilizing the remaining $UF_6$ and $PuF_6$ at the same time.

2. The reprocessing method by a fluoride volatility process using fractional distillation according to claim 1, wherein the second stage $F_2$ fluorination step is carried out by supplying a fluorine gas diluted to 20 to 40 vol % to a fluidized bed furnace operated in the temperature range of 500 to 750° C.

3. The reprocessing method by a fluoride volatility process using fractional distillation according to claim 1, wherein the separation and volatilization step is carried out by using at least one cold trap, and the removal of the part of $UF_6$ is carried out by fractional distillation at an operating temperature and pressure controlled so that $UF_6$ is in a gas region and $PuF_6$ is in a liquid region in the phase diagrams of $UF_6$ and $PuF_6$.

4. The reprocessing method by a fluoride volatility process using fractional distillation according to claim 2, wherein the separation and volatilization step is carried out by using at least one cold trap, and the removal of the part of $UF_6$ is carried out by fractional distillation at an operating temperature and pressure controlled so that $UF_6$ is in a gas region and $PuF_6$ is in a liquid region in the phase diagrams of $UF_6$ and $PuF_6$.

\* \* \* \* \*